Patented Feb. 16, 1937

2,070,962

UNITED STATES PATENT OFFICE 2,070,962

COMPOSITION OF MATTER

Ernest W. Reid, Pittsburgh, Pa., assignor, by mesne assignments, to Union Carbide and Carbon Corporation, a corporation of New York No Drawing. Application March 6, 1933, Serial No. 659,837

1 Claim. (Cl. 87—5)

The invention is a composition of matter adapted for use as a cleaning fluid for such purposes as degreasing of textiles, dry-cleaning of fabrics, and degreasing of metallic and other surfaces preparatory to the application of protective and ornamental coatings. Among the objects of the invention are: the provision of a composition which can be used in both the liquid and vapor phase; which has a substantially constant boiling point; which is relatively stable and non-corrosive; which has a flash point sufficiently high to permit its transportation and use commercially without special precautions; and which is an efficient solvent for oils, fats, waxes, resins, and the like.

Ethylene dichloride, $CH_2Cl.CH_2Cl$, is a colorless liquid boiling at 84° C., solidifying at —36° C., and having a specific gravity of 1.266 at 15°/15° C. It is a powerful solvent for oils, fats, and waxes, and possesses the added advantages of being very stable, non-corrosive to metals, and dielectric. It has a disadvantage in that its flash point, determined by the open-cup method, is 14° C. (57° F.), which makes it necessary to ship it under a red label, as is required by commerce regulations for all substances having flash points below 80° F.

Trichlorethylene, $CHCl:CCl_2$, is a colorless liquid boiling at 87.1° C., solidifying at —70° C., and having a specific gravity of 1.460 at 25°/25° C. It readily dissolves oils, fats, and waxes, many resins, rubber and certain inorganic substances, such as sulphur and phosphorus. It is non-flammable, non-corrosive, when pure, to ordinary metals like iron and steel, and is dielectric. It possesses the disadvantage of being relatively unstable in the presence of moisture, showing a tendency to decompose on exposure to sunlight.

I have found that a mixture of ethylene dichloride and trichlorethylene combines the advantages of the separate constituents while at the same time it greatly mitigates their individual disadvantages. Thus, such a mixture combines the solvent power of both liquids, has a higher flash point than ethylene dichloride, and has greater stability than trichlorethylene. If the concentration of trichlorethylene is high enough, the flash point of the mixture is entirely eliminated, and it becomes non-flammable. The mixture has an added advantage over other similar mixtures, as for example, ethylene dichloride and carbon tetrachloride, in that ethylene dichloride has the lower boiling point and also the higher vapor pressure of the two constituents and hence evaporates first, leaving the resulting mixture less flammable.

A mixture of ethylene dichloride and trichlorethylene has special advantages because it is azeotropic, forming a constant boiling mixture in the proportions 60 to 40 by volume of ethylene dichloride and trichlorethylene. This mixture boils at 82.1° C. (in a specific case, 100 cc. distilled between 80.5° and 82.5° C.), has a specific gravity of 1.336 at 20°/20° C., and has a flash point, determined by the open-cup method, of 29° C. (84.2° F.) which is well above the commerce requirements for transportation and use under a green label. Since the mixture has a constant boiling point, it is suitable for use in either liquid or vapor phase degreasing operations, and can be readily recovered by distillation without separation of the constituents or change in composition. This mixture, then, is unique in that it combines the advantages of two individual solvents, and still behaves physically like a unitary substance.

I claim:

Liquid solvent composition having a flash point above 80° F. consisting of substantially 60 parts by volume of ethylene dichloride and 40 parts by volume of trichlorethylene.

ERNEST W. REID.